(12) United States Patent
Zhang et al.

(10) Patent No.: US 8,318,123 B2
(45) Date of Patent: Nov. 27, 2012

(54) PREPARATION METHOD OF CARBON NANOTUBE BY DECOMPOSING THE POLYMER WITH HYDROTALCITE AS A CATALYST

(75) Inventors: Fazhi Zhang, Beijing (CN); Lixia Zhang, Beijing (CN); Xiaodong Lei, Beijing (CN); Rushi Li, Beijing (CN); Sailong Xu, Beijing (CN); Xue Duan, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 13/144,246

(22) PCT Filed: Jan. 12, 2010

(86) PCT No.: PCT/CN2010/000048
§ 371 (c)(1),
(2), (4) Date: Jul. 12, 2011

(87) PCT Pub. No.: WO2010/118621
PCT Pub. Date: Oct. 21, 2010

(65) Prior Publication Data
US 2011/0268646 A1  Nov. 3, 2011

(30) Foreign Application Priority Data

Apr. 17, 2009 (CN) .......................... 2009 1 0082445

(51) Int. Cl.
*D01F 9/12* (2006.01)
(52) U.S. Cl. ..................................... 423/447.1; 977/742
(58) Field of Classification Search ............... 423/447.1, 423/447.3; 977/742, 888
See application file for complete search history.

(56) References Cited

U.S. PATENT DOCUMENTS

2006/0115409 A1   6/2006   Li et al.

FOREIGN PATENT DOCUMENTS

| CN | 1718278 | | 1/2006 |
|---|---|---|---|
| CN | 1760114 | | 4/2006 |
| CN | 1830767 | | 9/2006 |
| CN | 101239713 | * | 8/2008 |
| CN | 101531363 | * | 9/2009 |

OTHER PUBLICATIONS

"Fullerene Pipes" Jie Liu, et al. Science May 22, 1998: 280 (5367), 1253-1256. [DOI:10.1126/science.280.5367.1253].*

(Continued)

*Primary Examiner* — Daniel C McCracken
*Assistant Examiner* — Richard M Rump
(74) *Attorney, Agent, or Firm* — Hamre, Schumann, Mueller & Larson, P.C.

(57) ABSTRACT

The present invention discloses a preparation method of carbon nanotube by decomposing the polymer with hydrotalcite as a catalyst, which belongs to the field of preparation technology of carbon nanotube (CNT). The technical solution of the present invention are as below: firstly, the hydrotalcite with the particle size at nanometer or sub-micron level is prepared, and then is added into the polymer. After the calcination process at high temperature and a treatment with acid, the nano-scale CNT can be obtained. The CNTs prepared by the method supplied in this invention not only have the advantages including high yield, uniform diameter, few structural defects, low impurity content, low cost and simple preparation process, which is suitable for large-scale industrial production, but also can solve the problem of recirculation of waste plastics and utilization of the resource.

1 Claim, 3 Drawing Sheets

OTHER PUBLICATIONS

Diameter-Controlled Synthesis of Carbon Nanotubes Chin Li Cheung, Andrea Kurtz, Hongkun Park, and Charles M. Lieber The Journal of Physical Chemistry B 2002 106 (10), 2429-2433.*

CN 101239713 machine translation.*

CN 1718278 machine translation.*

International Search Report issued in International Application No. PCT/CN2010/000048, mailed Mar. 25, 2010, 5 pages.

* cited by examiner

PREPARATION METHOD OF CARBON NANOTUBE BY DECOMPOSING THE POLYMER WITH HYDROTALCITE AS A CATALYST

FIELD OF THE INVENTION

The present invention relates to the field of preparation technology of carbon nanotube (CNT), and particularly provides a preparation method of CNT with the tube diameter ranged in 10 to 20 nanometers, that is, the CNT is prepared by decomposing the polymer with hydrotalcite as a catalyst.

BACKGROUND

Since the first discovery of carbon nanotube (CNT) by a Japanese scientist Lijima in 1991; in particular, since the discovery of monolayer CNT and the success in the large amount synthesis of CNT. CNT has aroused wide interest and has been a major research field of fullerene family. It is also one of the most cutting-edge research areas in the disciplines of physics, chemistry and materials science. Because of its unique structure, the study of CNT is of great theoretical significance and has many potential applications, For example, its unique structure is an ideal model of one-dimensional material; its large aspect ratio is expected to be used as tough carbon fiber, and its intensity is 100 times as tough as steel, whereas the weight is only ⅙ of steel; In addition. It also can be potentially used as molecular wire, nano-semiconductor material, catalyst support, molecular absorbent and near field emission material, and so on. Scientists believe that CNTs have sonic applications as follows: hydrogen storage materials, field emission, new type of carbon fiber and reinforcing materials, supercapacitor electrode, electronic probe, a new generation of electronic devices, lithium-ion battery electrode materials, stealth material, catalyst components, CNT muscle, polymer CNT composites, blending materials, synthesis within the CNTs, soluble reagents, the cleaning of radioactivity, the separation of isotope, and so on.

There are many methods for the preparation of CNTs, such as, graphite-arc discharge method, Lijima has prepared CNTs by graphite-arc discharge method, and the as-prepared CNTs have lots of defects, and the sintered CNTs came into a bundle with many amorphous carbon impurities; another one is laser flash method. Smalley et al have for the first time achieved large amount production of single-walled CNTs by the laser flash method. This method is high cost, which is not easy for application and dissemination; other methods include catalytic pyrolysis, chemical vapor deposition, template method, hydrothermal method, condensed-phase electro-generated method, and so on. Currently, the CNTs prepared by either of these methods have some disadvantages, such as, high impurity, low yield, and high cost. These largely restrict the study and application of CNTs.

The macromolecular polymer based on the carbon skeleton can supply large amount of carbon resources for the preparation of CNTs. Polymers are widely used in our daily life, different businesses and high-grade technology field, because of their light weight, easy processing, aesthetic and practical features. On one hand, the polymer supply people enormous material progress; one the other hand, the waste generated from polymers raises several serious questions. In Chinese city, the waste plastics (500 million-600 million tons) accounts for about 4%-10% in the municipal solid waste every year, and this value is still growing by 8%-9% per year. At present, the recirculation of the waste plastics only account for 10%, and 90% of the waste plastics are landfilled and burned in China. Landfill takes a lot of land resources for long periods. The decomposition of the waste will also take a long time, and this will affect the permeability of air and water, damage the soil, affect the growth of plant, and waste a lot of resources. High-temperature incineration of these waste plastics damage the burning equipment easily, and is easy to produce dioxin, hydrogen chloride, heavy metals and some other toxic substances, which can cause secondary pollution. Therefore, the application of the waste plastic into the preparation of CNTs has important social and economic significance on saving energy, decreasing waste volume, and reducing harm to the environment.

The present invention uses hydrotalcite with better catalytic and carbonization properties to catalyze the polymer into CNTs through a thermal decomposition process. This method not only solve the problem of the waste plastics recycling, but also achieve the utilization of their resources, which significantly reduce the cost of the production of CNTs.

SUMMARY

The object of the present invention is to provide a preparation method for CNTs, and to solve the problem of the preparation of CNTs by the use of hydrotalcite and carbon skeleton-based polymer. The present invention uses hydrotalcite with better catalytic and carbonization properties to catalyze the polymer into CNTs through a thermal decomposition process. This method not only solve the problem of the waste plastics recycling, but also achieve the utilization of their resources, which significantly reduce the cost of the production of CNTs.

Technical solution of the present invention: firstly, the hydrotalcite with the particle size at nanometer or sub-micron level is prepared, and then is added into the polymer. The calcination process at high temperature and a treatment with acid are then followed.

The detailed steps of the invention are as follows:

A. Mixing the hydrotalcite with the particle size at nanometer or sub-micron level and the polymer uniformly by mixing mill or extruder at 130-250° C. in which the mass ratio of the hydrotalcite to polymer are in the range 1:100-2:1;

B. Calcining the mixed sample obtained from step A in a muffle furnace at 200-1500° C. for 1-360 minutes;

C. Adding the product obtained from Step B into 1-6 mol/L nitric acid solution at 50-280° C. refluxing for 1-48 hours, and then the product was treated by centrifugation, washing, and drying; CNTs can be obtained.

In the step A, the chemical formula of the described hydrotalcite is: $[M^{2+}_{1-x}M^{3+}_x(OH)_2]^{x+} \cdot (A^{n-})_{x/n} \cdot mH_2O$, wherein the $M^{2+}$ is one, two or three types of $Mg^{2+}$, $Ni^{2+}$, $Cu^{2+}$, $Co^{2+}$, $Fe^{2+}$, $Zn^{2+}$, $Mn^{2+}$, $Cd^{2+}$, $Ca^{2+}$, $Pd^{2+}$ or $Pt^{2+}$, $M^{3+}$ is one or two types of $Al^{3+}$, $Cr^{3+}$, $Co^{3+}$, $Fe^{3+}$, $Ga^{3+}$, $V^{3+}$ or $In^{3+}$, $0.2 \leq x \leq 0.33$, m is the number of crystal water, the range of which is 0.5-9.

The described hydrotalcite was prepared by coprecipitation method, separate nucleation and aging steps method, non-equilibrium crystallization method or hydrothermal synthesis method.

The described polymers in the innovation comprise: polyethylene, polypropylene, polyisobutylene, polymethylpentene or poly acrylonitrile-butadiene-styrene.

The as-prepared product was qualitatively analyzed by Shimadu XRD-6000 powder X-ray diffraction; the structure of the product was determined by RM2000 Raman spectrometer; the morphology of the sample was analyzed using Hitachi-S3500N scanning electron microscope (SEM) and JEOL JEM-2100 transmission electron microscope (TEM).

The effect of the invention: the CNTs prepared by the method supplied in this invention not only have the advantages including high yield, uniform diameter, few structural defects, low impurity content, low cost and simple preparation process, which is suitable for large-scale industrial production, but also can solve the problem of recirculation of waste plastics and utilization of the resource.

DETAILED DESCRIPTION OF THE PREFERRED EMBODIMENT

The present invention will be further explained through following examples:

Example 1

A: preparing the hydrotalcite by the method of separate nucleation and aging steps, and the detailed method comprise: weighting 174.48 g of $Ni(NO_3)_2 \cdot 6H_2O$ and 112.54 g of $Al(NO_3)_3 \cdot 9H_2O$, and dissolving them into 750 mL deionized water to form a mixed salt solution; weighting 64.8 g NaOH and 95.39 g $Na_2CO_3$, and dissolving them into 750 mL deionized water to form a mixed alkali solution, adding the two solution into the colloid mill (the slit width between the rotor and the stator: 2 mm; the operating voltage: 140 V; the rotor speed: 5000 rpm) at the same time. Transferring the mixed slurry into a three-neck flask, then heating and stirring the slurry under nitrogen atmosphere, after refluxing and crystallizing for 6 hours, washing the slurry throughout until the pH value reach to 7. After dried for 12 hours at 70° C., the Ni—Al-hydrotalcite can be obtained;

B: Weighting 10 g of hydrotalcite obtained from step A and 100 g of polypropylene, mixing them uniformly at 170° C. on a dual-wheel mixing machine;

C: Calcining the mixture obtained from step B for 5 minutes in a muffle furnace at 900° C.;

D: Adding the product obtained in step C into 3 mol/L nitric acid solution at 130° C., and refluxing for 24 hours, and then treating the product by centrifugation, washing, and drying at 70° C. for 12 hours; CNTs can be obtained.

Figure 1:
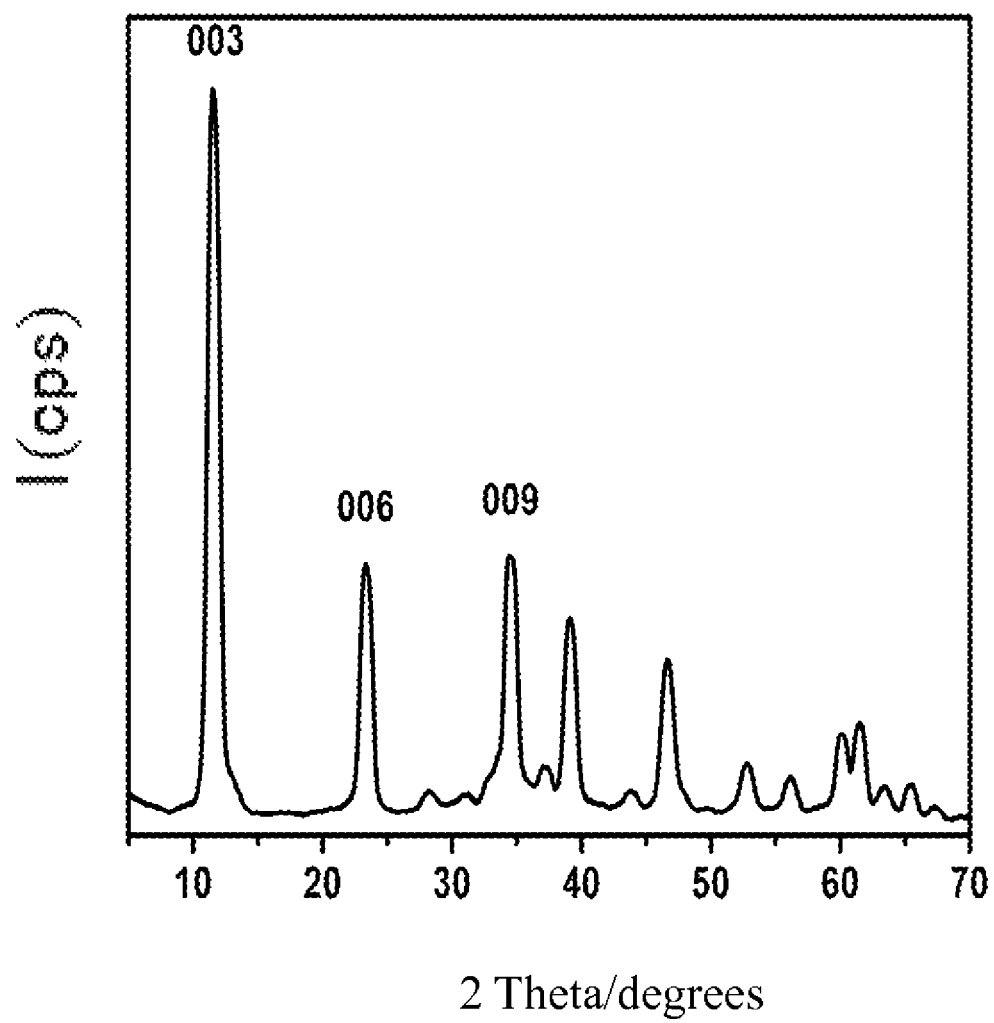
FIG. 1 is the XRD pattern of the hydrotalcite obtained from example 1.

FIG. 1 is the XRD pattern of the hydrotalcite obtained from step A, and it can be observed that three characteristic diffraction peaks ((003), (006) and (009)) with the maximum intensity appear at 11.54°, 23.34° and 34.44°, respectively. The corresponding interlayer spacing of (003) diffraction peaks $d_{003}$ is 0.76 nm. The baseline of diffraction profiles is low and flat; the diffraction peak is shape, showing that the obtained NiAl—$CO_3$-LDHs feature a complete layered structure.

Figure 2:
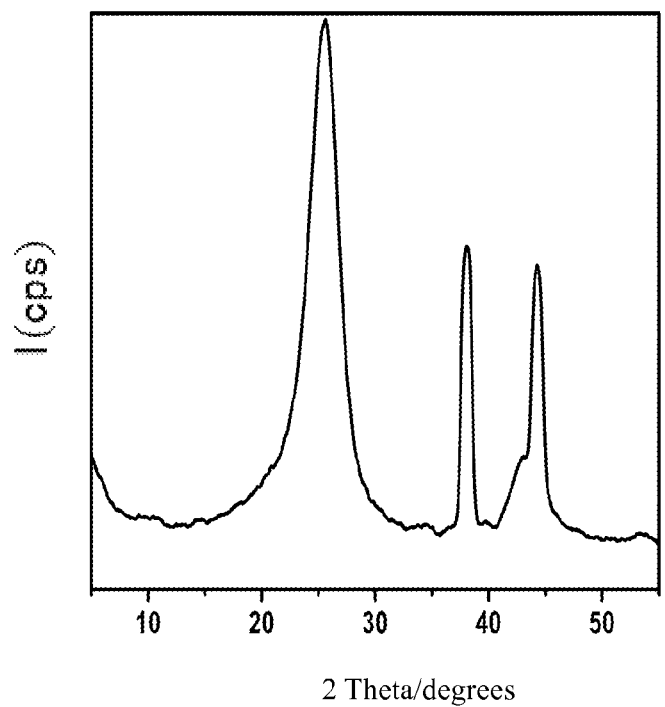
FIG. 2 is the XRD pattern of the CNTs obtained from example 1.

FIG. 2 is the XRD pattern of the obtained CNTs. It can be seen that two characteristic diffraction peaks of graphite appear at 2θ of 25.76° and 42.87°; two weak characteristic peaks assigned to metal oxide appear at 37.16° and 43.22°.

Figure 3:
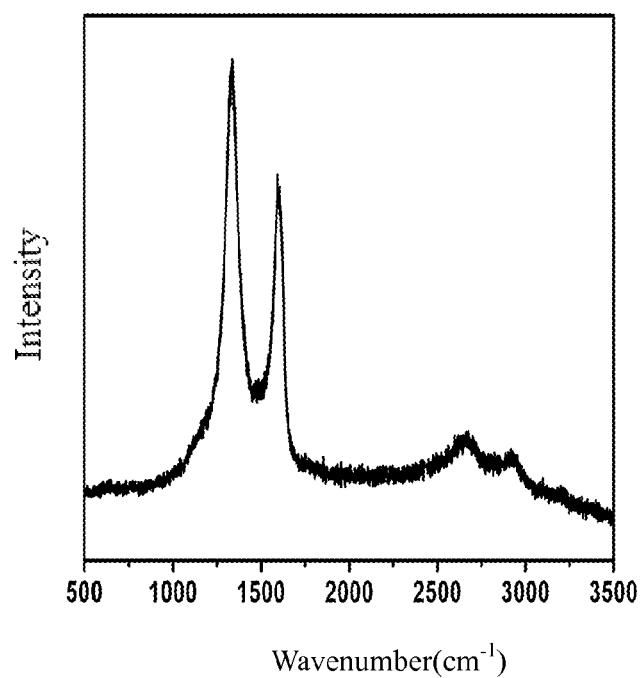
FIG. 3 is the Raman spectrum pattern of the CNTs obtained from example 1.

FIG. 3 shows the Raman spectrum of the obtained CNTs, and it can be seen that four obvious peaks appear at 1337, 1594, 2676 and 2918 $cm^{-1}$, respectively. According to the literature reported, multi-walled CNTs usually has obvious peaks at 1350 and 1580 $cm^{-1}$, where the peak at 1350 $cm^{-1}$ are mainly assigned to a number of disordered structures, such as graphite lattice defects and some amorphous carbon impurities in the multi-walled CNTs; the peak at 1580 $cm^{-1}$ is attributed to the Raman active vibrational modes, reflecting a high symmetry and high orientation of graphite structure. Therefore, the obtained product is multi-walled CNTs according to the Raman spectrum.

Figure 4:
FIG. 4 is the SEM profile of the CNTs obtained from example 1.

FIG. 4 is the SEM profile of the obtained CNTs, and it can be seen that the product is one layer of one-dimensional wire-like material disorderly intertwined with each other.

Figure 5:
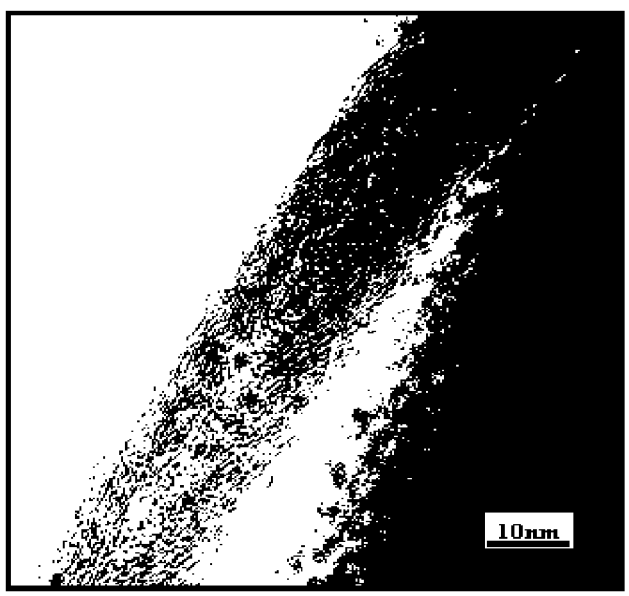
FIG. 5 is the TEM profile of the CNTs obtained from example 1.

FIG. 5 is the TEM profile of the CNTs, and it can be seen that the samples have a hollow-tubular structure, in line with the morphology of multi-walled CNTs. The diameter of CNTS is in the range 10~30 nm; the wall is relative thick and the cavity is relatively small.

Example 2

A: the same as example 1A;
B: Weighting 100 g of hydrotalcite obtained from step A and 100 g of polypropylene, mixing them uniformly at 170° C. on a dual-wheel mixing machine;
C: Calcining the mixture obtained from step B for 5 minutes in a muffle furnace at 900° C.;
D: Adding the product obtained in step C into 3 mol/L, nitric acid solution at 130° C., and refluxing for 24 hours, and then treating the product by centrifugation, washing, and drying at 70° C. for 12 hours; CNTs can be obtained.

Example 3

A: the same as step A in example 1;
B: the same as step B in example 1;
C: Calcining the mixture obtained from step B for 120 minutes in a muffle furnace at 900° C.;
D: Adding the product obtained in step C into 3 mol/L nitric acid solution at 130° C., and refluxing for 24 hours, and then treating the product by centrifugation, washing, and drying at 70 for 12 hours; CNTs can be obtained.

Example 4

A: Weighting 174.48 g of $Ni(NO_3)_2 \cdot 6H_2O$ and 75.96 g of $Al(NO_3)_3 \cdot 9H_2O$, and dissolving them into 750 mL deionized water to form a mixed salt solution: weighting 51.36 g NaOH and 63.59 g $Na_2CO_3$, and dissolving them into 750 mL deionized water to form a mixed alkali solution, adding the two solution into the colloid mill (the slit width between the rotor and the stator: 2 mm; the operating voltage: 140 V; the rotor speed: 5000 rpm) at the same time. Transferring the mixed slurry into a three-neck flask, then heating and stirring the slurry under nitrogen atmosphere at 70° C., after refluxing and crystallizing for 6 hours, washing the slurry throughout until the pH value reach to 7. After drying the slurry for 12 hours at 70° C., the Ni—Al-hydrotalcite can be obtained;
B: the same as step B in example 1;
C: the same as step C in example 1;
D: the same as step D in example 1.

Example 5

A: Preparing the hydrotalcite by the method of separate nucleation and aging steps, and the detailed method comprise: weighting 43.62 g of Ni(NO$_3$)$_2$.6H$_2$O, 115.38 g of Mg(NO$_3$)$_2$.6H$_2$O and 112.54 g of Al (NO$_3$)$_3$.9H$_2$O, and dissolving them into 750 deionized water to form a mixed salt solution; weighting 57.60 g NaOH and 95.39 g Na$_2$CO$_3$, and dissolving them into 750 mL deionized water to form a mixed alkali solution, adding the two solution into the colloid mill (the slit width between the rotor and the stator: 2 mm; the operating voltage: 140 V; the rotor speed: 5000 rpm) at the same time.

Transferring the mixed slurry into a three-neck flask, then heating and stirring the slurry under nitrogen atmosphere at 70° C., after refluxing and crystallizing for 6 hours, washing the slurry throughout until the pH value reach to 7. After drying the slurry for 12 hours at 70° C., the Ni—Mg—Al-hydrotalcite can be obtained;

B: the same as step B in example 1;
C: the same as step C in example 1;
D: the same as step D in example 1.

Example 6

A: the same as step A in example 1;
B: Weighting 150 g of hydrotalcite obtained from step A and 100 g of polyethylene, mixing them uniformly at 170° C. on a dual-wheel mixing machine;
C: Calcining the mixture obtained from step B for 180 minutes in a muffle furnace at 900° C.;
D: Adding the product obtained in step C into 3 mol/L nitric acid solution at 130° C., and refluxing for 2 hours, and then treating the product by centrifugation, washing, and drying at 70° C. for 12 hours; CMS can be obtained.

Example 7

A: the same as step A in example 1;
B: Weighting 180 g of hydrotalcite obtained from step A and 100 g of polyethylene, mixing them uniformly at 200° C. on a dual-wheel mixing machine;
C: Calcining the mixture obtained from step B for 360 minutes in a muffle furnace at 360° C.;
D: Adding the product obtained in step C into 3 mol/L, nitric acid solution at 130° C., and refluxing for 48 hours, and then treating the product by centrifugation, washing, and drying at 70° C. for 12 hours; CNTs can be obtained.

Example 8

A: the same as step A in example 2;
B: Weighting 200 g of hydrotalcite obtained from step A and 100 g of polyisobutylene, mixing them uniformly at 250° C. on a dual-wheel mixing machine;
C: Calcining the mixture obtained from step B for 360 minutes in a muffle furnace at 360° C.;
D: Adding the product obtained in step C into 3 mol/L nitric acid solution at 130° C., and refluxing for 36 hours, and then treating the product by centrifugation, washing, and drying at 70° C. for 12 hours; CNTs can be obtained.

Example 9

A: Weighting 35.65 g of NiCl$_2$.6H$_2$O, 91.69 g of MgCl$_2$.6H$_2$O and 72.43 g of AlCl$_3$. 6H$_2$O, and dissolving them into 750 mL deionized water to form a mixed salt solution; weighting 72.00 g NaOH and dissolving them into 750 mL deionized water to form a mixed alkili solution, adding the two solution into the colloid mill (the slit width between the rotor and the stator: 2 mm; the operating voltage: 140 V; the rotor speed: 5000 rpm) at the same time. Transferring the mixed slurry into a three-neck flask, then heating and stirring the slurry under nitrogen atmosphere at 70° C., after refluxing and crystallizing for 6 hours, the Ni—Mg—Al-hydrotalcite can be obtained;

B: Weighting 1 g of hydrotalcite obtained from step A and 100 g of polymethylpentene, mixing them uniformly at 180° C. on a dual-wheel mixing machine;
C: Calcining the mixture obtained from step B for 350 minutes in a muffle furnace at 300° C.;
D: Adding the product obtained in step C into 1.5 mol/L nitric acid solution at 70° C. and refluxing for 46 hours, and then treating product by centrifugation, washing, and drying at 70° C. for 12 hours; CNTs can be obtained.

Example 10

A: Weighting 4 g of hydrotalcite with the particle size at the nanometer level and 100 g of poly acrylonitrile-butadiene-styrene, mixing them uniformly at 150° C. on a dual-wheel mixing machine;
B: Calcining the mixture obtained from step A for 5 minutes in a muffle furnace at 1200° C.;
C: Adding the product obtained in step B into 4.5 mol/L nitric acid solution at 260° C., and refluxing for 4 hours, and then treating the product by centrifugation, washing, and drying at 70° C. for 12 hours; CNTs can be obtained.

Example 11

A: Weighting 2 g of hydrotalcite with the particle size at the nanometer level and 100 g of polyisobutylene, mixing them uniformly at 140° C. on a dual-wheel mixing machine;
B: Calcining the mixture obtained from step A for 330 minutes in a muffle furnace at 500° C.;
C: Adding the product obtained in step B into 2.5 mol/L nitric acid solution at 90° C., and refluxing for 42 hours, and then treating the product by centrifugation, washing, and drying at 70° C. for 12 hours; CNTs can be obtained.

Example 12

A: Weighting 120 g of hydrotalcite with the particle size at sub-micron level and 100 g of poly acrylonitrile-butadiene-styrene, mixing them uniformly at 240° C. on a dual-wheel mixing machine;
B: Calcining the mixture obtained from step A for 20 minutes in a muffle furnace at 1400° C.;
C: Adding the product obtained in step B into 5.5 mol/L nitric acid solution at 230° C., and refluxing for 8 hours, and then treating the product by centrifugation, washing, and drying at 70° C. for 12 hours; CNTs can be obtained.

Example 13

A: Preparing the hydrotalcite by the coprecipitation method, and the detailed method comprise: weighting 174.48 g of Ni(NO$_3$)$_2$.6H$_2$O and 112.54 g of Al (NO$_3$)$_3$.9H$_2$O, and dissolving them into 750 mL deionized water to form a mixed salt solution; weighting 64.8 g NaOH and 95.39 g Na$_2$CO$_3$, and dissolving them into 750 mL deionized water to form a mixed alkali solution, adding the mixed alkali solution drop-wisely into the mixed salt solution under nitrogen atmosphere, until the pH value reach to 6.5. Refluxing and crystallizing the obtained slurry for 6 hours, washing the slurry throughout until the pH value reach to 7. After being dried for 12 hours at 70° C., the Ni—Al-hydrotalcite can be obtained;

B: Weighting 10 g of hydrotalcite obtained from step A and 100 g of polypropylene, mixing them uniformly at 170° C. on a dual-wheel mixing machine;

C: Calcining the mixture obtained from step B for 5 minutes in a muffle furnace at 900° C.;

D: Adding the product obtained in Step C into 3 mol/L nitric acid solution at 130° C., and refluxing for 24 hours, and then treating the product by centrifugation, washing, and drying at 70° C. for 12 hours; CNTs can be obtained.

Example 14

A: Preparing the hydrotalcite by the coprecipitation method, and the detailed method comprise: weighting 35.65 g of $NiCl_2.6H_2O$, 91.69 g of $MgCl_2.6H_2O$ and 72.43 g of $AlCl_3.6H_2O$, and dissolving them into 750 mL deionized water to form a mixed salt solution; weighting 72.00 g NaOH and dissolving them into 750 mL deionized water to form a mixed alkali solution, adding the mixed alkali solution dropwisely into the mixed salt solution under nitrogen atmosphere, until the pH value reach to 7.5. Refluxing and crystallizing the obtained slurry for 6 hours, the Ni—Mg—Al-hydrotalcite can be obtained;

B: Weighting 1 g of hydrotalcite obtained from step A and 100 g of polymethylpentene, mixing them uniformly at 180° C. on a dual-wheel mixing machine;

C: Calcining the mixture obtained from step B for 350 minutes in a muffle furnace at 350° C.;

D: Adding the product obtained in step C into 1.5 mol/L nitric acid solution at 70° C., and refluxing for 46 hours, and then treating the product by centrifugation, washing, and drying at 70° C. for 12 hours; CNTs can be obtained.

The invention claimed is:
1. A method of preparing carbon nanotubes (CNTs) comprising:
    decomposing a polymer with hydrotalcite as a catalyst, comprising:
        A. mixing the hydrotalcite with a particle size at nanometer or sub-micron level and the polymer uniformly by a mixing mill or an extruder at 130-250° C., a mass ratio of the hydrotalcite to the polymer being in a range of 1:100-2:1;
        B. calcining the mixture obtained from step A in a muffle furnace at 200-1500° C. for 1-360 minutes; and
        C. adding a product obtained from step B into a 1-6 mol/L nitric acid solution at 50-280° C., refluxing for 1-48 hours, and then treating the product by centrifugation, washing, and drying to obtain the CNTs,
    wherein the formula of the hydrotalcite is: $[M^{2+}_{1-x}M^{3+}_x(OH)_2]^{x+}.(A^{n-})_{x/n}.mH_2O$, where the $M^{2+}$ is one, two or three types selected from the group consisting of $Mg^{2+}$, $Ni^{2+}$, $Cu^{2+}$, $Co^{2+}$, $Fe^{2+}$, $Zn^{2+}$, $Mn^{2+}$, $Cd^{2+}$, $Ca^{2+}$, $Pd^{2+}$ and $Pt^{2+}$, $M^{3+}$ is one or two types selected from the group consisting of $Al^{3+}$, $Cr^{3+}$, $Co^{3+}$, $Fe^{3+}$, $Ga^{3+}$, $V^{3+}$ and $In^{3+}$, $0.2 \leq x \leq 0.33$, m is the number of crystal water that has a range of 0.5-9;
    wherein the hydrotalcite is prepared by a coprecipitation method, a separate nucleation and aging steps method, a non-equilibrium crystallization method or a hydrothermal synthesis method; and
    wherein the polymer comprises polyethylene, polypropylene, polyisobutylene, polymethylpentene or poly acrylonitrile-butadiene-styrene.

* * * * *